(12) United States Patent
Evers et al.

(10) Patent No.: US 7,702,888 B2
(45) Date of Patent: Apr. 20, 2010

(54) BRANCH PREDICTOR DIRECTED PREFETCH

(75) Inventors: Marius Evers, Sunnyvale, CA (US); Trivikram Krishnamurthy, Sunnyvale, CA (US)

(73) Assignee: GlobalFoundries Inc., Grand Cayman (KY)

( * ) Notice: Subject to any disclaimer, the term of this patent is extended or adjusted under 35 U.S.C. 154(b) by 459 days.

(21) Appl. No.: 11/711,925

(22) Filed: Feb. 28, 2007

(65) Prior Publication Data

US 2008/0209173 A1 Aug. 28, 2008

(51) Int. Cl.
*G06F 9/00* (2006.01)
(52) U.S. Cl. ................ 712/237; 712/239; 712/207
(58) Field of Classification Search ............ 712/205, 712/207, 237, 238, 239
See application file for complete search history.

(56) References Cited

U.S. PATENT DOCUMENTS

| | | | | |
|---|---|---|---|---|
| 5,423,048 A * | 6/1995 | Jager | ................ | 712/207 |
| 5,544,342 A * | 8/1996 | Dean | ................ | 711/119 |
| 5,778,435 A * | 7/1998 | Berenbaum et al. | ........ | 711/137 |
| 5,822,790 A * | 10/1998 | Mehrotra | ................ | 711/213 |
| 6,012,134 A * | 1/2000 | McInerney et al. | .......... | 711/207 |
| 6,651,162 B1 * | 11/2003 | Levitan et al. | .............. | 712/238 |
| 6,651,245 B1 * | 11/2003 | Damron et al. | ............. | 717/159 |
| 7,383,418 B2 * | 6/2008 | Janik et al. | ................ | 711/216 |
| 2004/0049639 A1 * | 3/2004 | So et al. | ................ | 711/137 |
| 2005/0210200 A1 * | 9/2005 | So et al. | ................ | 711/137 |
| 2006/0047915 A1 * | 3/2006 | Janik et al. | ................ | 711/137 |

FOREIGN PATENT DOCUMENTS

WO 2008/016849 2/2008

OTHER PUBLICATIONS

Stark, "Out of Order Fetch, Decode and Issue," Dissertation, Computer Science and Engineering, University of Michigan, 2000, http://www.eecs.umich.edu/techreports/cse/99/CSE-TR-415-99.pdf.
Patt, et al, "One Billion Transistors, One Uniprocessor, One Chip," Computer, vol. 30, Issue 9, Sep. 1997, pp. 51-57.
International Search Report in application No. PCT/US2008/002674 issued Jun. 13, 2008.

* cited by examiner

*Primary Examiner*—Aimee J Li
(74) *Attorney, Agent, or Firm*—Meyertons, Hood, Kivlin, Kowert & Goetzel, P.C.; B. Noel Kivlin

(57) ABSTRACT

An apparatus for executing branch predictor directed prefetch operations. During operation, a branch prediction unit may provide an address of a first instruction to the fetch unit. The fetch unit may send a fetch request for the first instruction to the instruction cache to perform a fetch operation. In response to detecting a cache miss corresponding to the first instruction, the fetch unit may execute one or more prefetch operations while the cache miss corresponding to the first instruction is being serviced. The branch prediction unit may provide an address of a predicted next instruction in the instruction stream to the fetch unit. The fetch unit may send a prefetch request for the predicted next instruction to the instruction cache to execute the prefetch operation. The fetch unit may store prefetched instruction data obtained from a next level of memory in the instruction cache or in a prefetch buffer.

20 Claims, 4 Drawing Sheets

BRANCH PREDICTOR DIRECTED PREFETCH

BACKGROUND OF THE INVENTION

1. Field of the Invention

This invention relates to microprocessor architecture and, more particularly, to an instruction prefetch mechanism.

2. Description of the Related Art

In various systems, the front end of a processor core typically includes an instruction fetch unit for generating fetch request to retrieve instructions from an instruction cache. On a cache hit, the fetched instructions are typically stored in a fetch FIFO or fetch queue located between the instruction fetch unit and an instruction decode unit. On a cache miss, a memory request is usually generated and sent to the next level of memory, e.g. a level 2 (L2) cache. The fetch pipeline may then be stalled until the cache miss is serviced. This usually results in a significant performance hit since it delays the execution of instructions.

In other systems, the fetch mechanism may initiate an out-of-order fetching mode while the cache miss is being serviced. During the out-of-order fetching mode, a fetch operation is performed for one or more new instructions. On a cache hit corresponding to a new instruction, the data is typically stored in the fetch FIFO. On a cache miss corresponding to the new instruction, a memory request is usually generated and sent to the next level of memory, e.g. an L2 cache. If there is a cache hit in the next level of memory, the data is typically stored in the fetch FIFO. In this implementation, entries are allocated in the fetch FIFO whether there is a cache miss or cache hit corresponding to the new instruction. Therefore, to perform the out-of-order fetch, the fetch FIFO needs to have space available for the data. Even if the fetch FIFO has available space, it may fill up during the out-of-order fetch mode and stall the process. Furthermore, in this design, the increased size and complexity of the fetch FIFO and corresponding management mechanism may increase die area and cost of the system.

SUMMARY

Various embodiments of an apparatus for executing branch predictor directed prefetch operations are disclosed. The apparatus may include an instruction cache, a fetch unit, and a branch prediction unit. According to one embodiment, the branch prediction unit may provide an address of a first instruction to the fetch unit. The fetch unit may send a fetch request for the first instruction to the instruction cache to perform a fetch operation. In response to detecting a cache miss corresponding to the first instruction, the fetch unit may execute one or more prefetch operation while the cache miss corresponding to the first instruction is being serviced. The branch prediction unit may provide an address of a predicted next instruction to the fetch unit. The branch prediction unit may predict the address of the next instruction based on the predicted outcome of various branches in the instruction stream. The fetch unit may send a prefetch request for the predicted next instruction to the instruction cache to execute the prefetch operation.

In one embodiment, in response to detecting a cache miss corresponding to the predicted next instruction, the fetch unit may send a prefetch request for the predicted next instruction to a next level of memory, e.g., an L2 cache. If a cache hit is detected in the next level of memory, the fetch unit may store prefetched instruction data corresponding to the predicted next instruction in the instruction cache. In other embodiments, the fetch unit may store prefetched instruction data corresponding to the predicted next instruction in a prefetch buffer. The prefetch request may be sent to other parts of the memory hierarchy of the system. For instance, if a cache miss is detected in the L2 cache, the prefetch request may be sent to an L3 cache or main memory until the instruction data is found. In other embodiments, the prefetch operation may be aborted if a cache miss is detected in the L2 cache.

In one embodiment, if a cache hit is detected corresponding to the predicted next instruction, the fetch unit may send a next prefetch request for a subsequent predicted instruction to the instruction cache to execute a next prefetch operation. The fetch unit may obtain the address of the subsequent predicted instruction from the branch prediction unit. After servicing the cache miss corresponding to the first instruction, the fetch unit may stop executing prefetch operations and resume execution of fetch operations to the instruction cache.

Figure 1:
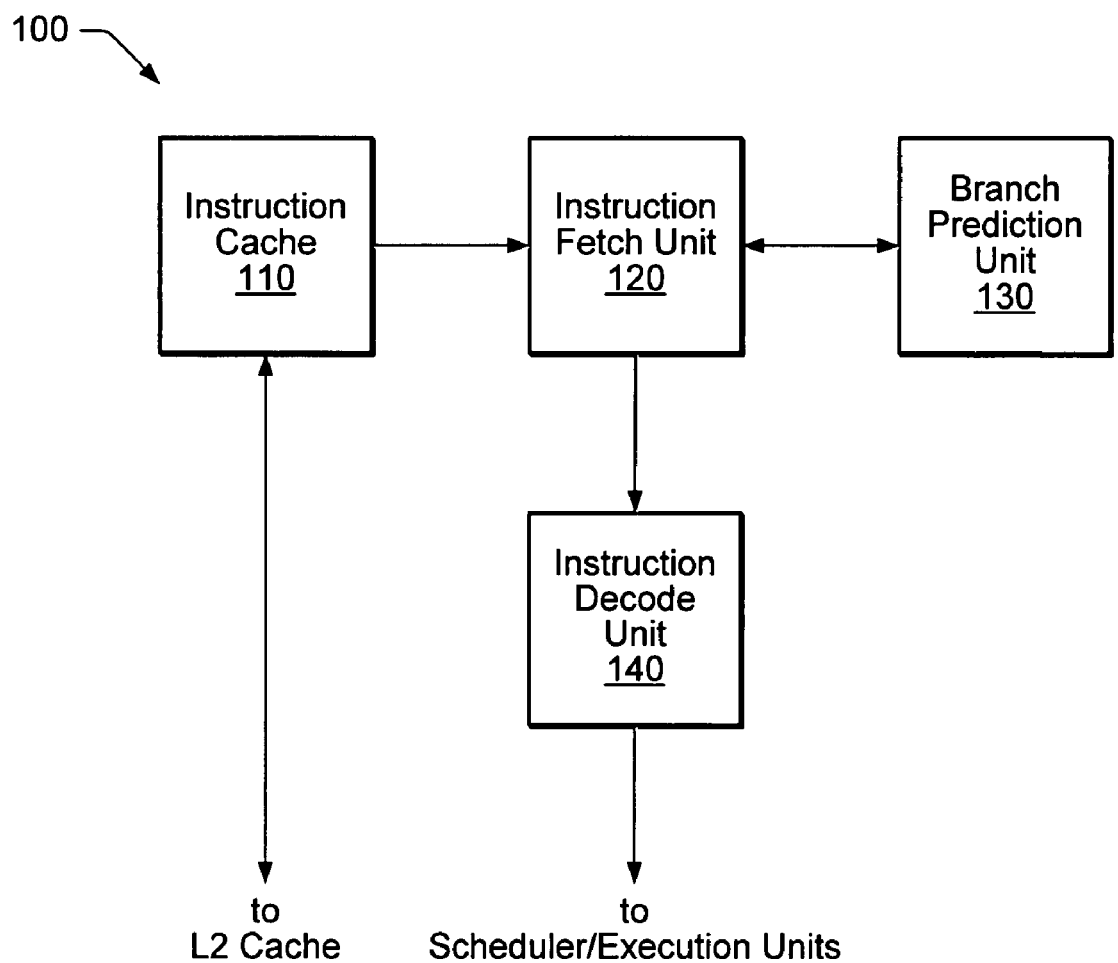
FIG. 1 is a block diagram of one embodiment of an exemplary front end of a processor core.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of an exemplary front end of a processor core 100 is shown. As illustrated, the front end of processor core 100 may include an instruction cache (iCache) 110, an instruction fetch unit (IFU) 120, a branch prediction unit (BPU) 130, and an instruction decode unit (DEC) 140. In this specific implementation, iCache 110 may be connected to IFU 120, which may be further connected to BPU 130 and DEC 140.

ICache 110 may store instructions prior to their being retrieved, decoded and issued for execution. IFU 120 may perform fetch and prefetch operations to iCache 110 and other levels of memory based on information obtained from the BPU 130, as will be further described below with reference to FIG. 2. For instance, BPU 130 may predict the outcome of various branches in the instruction stream to be provided for execution, and therefore predict future fetch and prefetch addresses for use by IFU 120. DEC 140 may obtain the fetched instructions from IFU 120 to decode the instructions prior to their being issued for execution. In some embodiments, iCache 110 may be further connected to an L2 cache, e.g., to service instruction cache misses, and DEC 140 may be further connected to one or more schedulers and execution units, e.g., to schedule decoded instructions for execution, as will be further described below with reference to FIG. 2 and FIG. 3.

In various embodiments, processing core 100 may be comprised in any of various types of computing or processing systems, e.g., a workstation, a personal computer (PC), a server blade, a portable computing device, a game console, a system-on-a-chip (SoC), a television system, an audio system, among others. For instance, in one embodiment, processing core 100 may be included within a processing unit that is connected to a circuit board or motherboard of a computing system. In some embodiments, processor core 100 may be one of multiple processor cores included within a processing unit of a computing system, as will be further described below with reference to FIG. 4.

Figure 2:
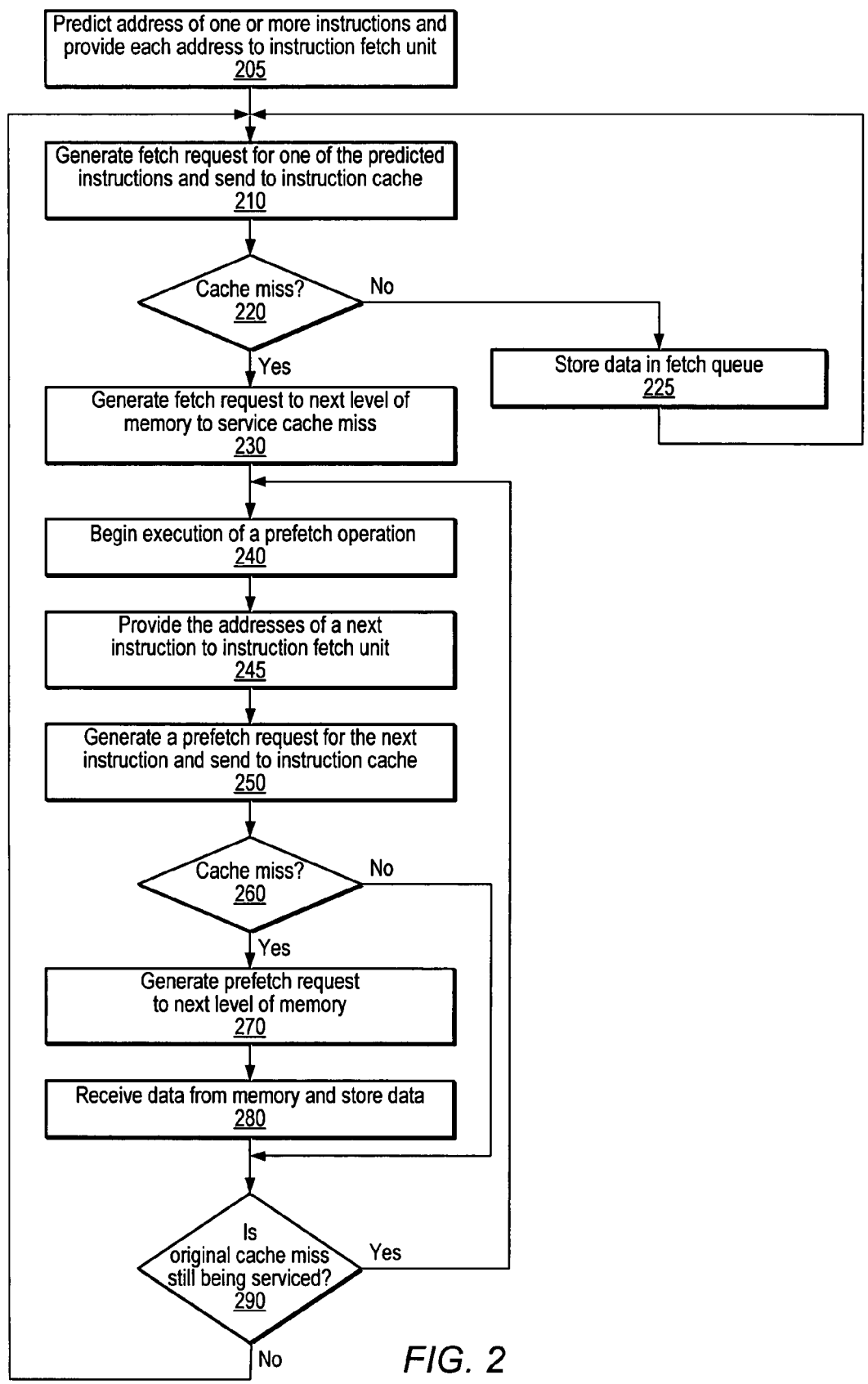
FIG. 2 is a flow diagram illustrating a method for performing instruction fetch and prefetch operations, according to one embodiment.

FIG. 2 is a flow diagram illustrating a method for performing instruction fetch and prefetch operations based on the predicted instruction stream, according to one embodiment. It should be noted that in various embodiments, some of the steps shown may be performed concurrently, in a different order than shown, or omitted. Additional steps may also be performed as desired.

Referring collectively to FIG. 2 and FIG. 1, during operation, BPU 130 may predict an address of one or more instructions to be fetched by EFU 120 based on the predicted outcome of various branches in the instruction stream, and provide each address to IFU 120 (block 205). For instance, in one embodiment, BPU 130 may provide each address to IFU 120 by storing the address of each of the predicted instructions in a prediction queue. At a later time, IFU 120 may then access the prediction queue to pull the address needed for a fetch request. In various embodiments, the prediction queue may be a memory included within or connect to BPU 130 for storing the predicted addresses of instructions of the instruction steam. It is noted, however, that in other embodiments BPU 130 may provide the address of one or more predicted instructions to IFU 120 by other mechanisms.

IFU 120 may generate a fetch request for one of the predicted instructions (a first instruction) and send the fetch request to iCache 110 (block 210). IFU 120 may then determine whether the fetch request to iCache 110 resulted in a cache miss (block 220), meaning the first instruction was not found in iCache 110. If a cache miss corresponding to the first instruction is not detected, the fetch request resulted in a cache hit (instruction was found in iCache 110) and the fetched instruction data is stored in a fetch queue or fetch FIFO (block 225). In various embodiments, the fetch queue may be a memory located between the IFU 120 and the DEC 140, or within IFU 120, for storing fetched instruction data to be decoded by DEC 140. Also, if a cache hit is detected, IFU 120 may continue performing fetch operations. Specifically, IFU 120 may generate a next fetch request for a next instruction and send the fetch request to iCache 110 (block 210).

If a cache miss corresponding to the first instruction is detected, IFU 120 may generate a fetch request to the next level of memory to service the cache miss (block 230). For instance, in one embodiment, IFU 120 may generate a fetch request to the L2 cache to service the cache miss. It is noted, however, that the fetch request may be sent to other parts of the memory hierarchy of the system.

Furthermore, in response to detecting a cache miss corresponding to the first instruction, IFU 120 may stop performing new fetch operations and may instead begin executing one or more branch predictor directed prefetch operations while the cache miss corresponding to the first instruction is being serviced (block 240). Branch predictor directed prefetch operations are different than fetch operations in that these prefetch operations do not implement the normal process to retrieve instructions that is employed by fetch operations, as will be further described below.

In various embodiments, BPU 130 may provide an address of a predicted next instruction to IFU 120 (block 245). For instance, in one embodiment, BPU 130 may provide the next predicted address to IFU 120 by storing the address in the prediction queue. Then, IFU 120 may access the prediction queue to pull the address needed for the prefetch request. It is noted, however, that in other embodiments BPU 130 may provide the address of the predicted next instruction to IFU 120 by other mechanisms.

It is noted that the address of the predicted next instruction may be the address of the predicted next instruction in the instruction stream. In other words, BPU 130 may provide to IFU 120 the address of the predicted next instruction based on the predicted outcome of one or more branches in the instruction stream, e.g., based on the predicted outcome of one or more conditional branches. It is further noted that in various embodiments the address of the predicted next instruction is a non-sequential address. Additionally, it is noted that in some embodiments, addresses are given for groups of sequential instructions, rather than individual instructions.

After obtaining the address of the predicted next instruction in the instruction stream, IFU 120 may generate a prefetch request for the predicted next instruction and send the prefetch request to iCache 110 (block 250). IFU 120 may then determine whether the prefetch request for the predicted next instruction to iCache 110 resulted in a cache miss (block 260), meaning the predicted next instruction was not found in iCache 110. If the prefetch request does not result in a cache miss, the predicted next instruction was found in iCache 110 (cache hit) and therefore no action is taken corresponding to the predicted next instruction. In this case, no action may be needed since the predicted next instruction is stored in iCache 110 and ready to be retrieved by a future fetch operation. Instead, if a cache hit corresponding to the predicted next instruction is detected, IFU 120 may detect whether the cache miss corresponding to the first instruction is still being serviced (block 290). If the cache miss corresponding to the first instruction is still being serviced, IFU 120 may begin executing a next prefetch operation (block 240), i.e., generate a prefetch request for a subsequent predicted instruction in the instruction stream. However, if the cache miss corresponding to the first instruction has been serviced, IFU 120 may stop performing new prefetch operations and may instead resume executing fetch operations to the iCache 110, i.e., execute a next fetch operation (block 210).

In response to detecting a cache miss corresponding to the predicted next instruction, IFU 120 may generate a prefetch request to the next level of memory to service the cache miss (block 270). For instance, in one embodiment, IFU 120 may generate a prefetch request to the L2 cache to service the cache miss corresponding to the predicted next instruction. It is noted that the prefetch request may be sent to other parts of the memory hierarchy of the system. For instance, if a cache miss is detected in the L2 cache, the prefetch request may be sent to the L3 cache or main memory until the instruction data is found. It is further noted, however, that in other embodiments the prefetch operation may be aborted if a cache miss is detected in the L2 cache.

If the prefetch request for the predicted next instruction to one of the levels of the memory hierarchy results in a cache hit, the instruction data corresponding to the predicted next instruction is provided to either iCache 110 or a prefetch buffer and stored (block 280). The prefetch buffer may be a memory that is within or connected to IFU 120 for storing instruction data during prefetch operations. The instruction data corresponding to the predicted next instruction may be stored in iCache 110 or the prefetch buffer to be available for retrieval by a future fetch operation. In some embodiments, prefetched instruction data may be temporarily stored in the prefetch buffer until the data can be stored in iCache 110. In other embodiments, the prefetched instruction data may be stored in either iCache 110 or the prefetch buffer depending on the design of processor core 100.

After storing the prefetched instruction data in the iCache 110 or the prefetch buffer, IFU 120 may detect whether the cache miss corresponding to the first instruction is still being serviced (block 290). If the cache miss corresponding to the first instruction is still being serviced, IFU 120 may begin executing a next prefetch operation (block 240), i.e., generate a prefetch request for a subsequent predicted instruction in the instruction stream. If the cache miss corresponding to the first instruction has been serviced, IFU 120 may stop performing new prefetch operations and may instead resume executing fetch operations to the iCache 110, i.e., execute a next fetch operation (block 210). It is noted that the above process may be repeated for various other fetch and prefetch operations.

Besides the fact that branch predictor directed prefetch operations are BPU 130 directed and executed in response to a cache miss, these prefetch operations are different than fetch operations in that these prefetch operations do not implement the normal process to retrieve instructions that is employed by fetch operations. Fetch operations typically store the fetched instruction data in a fetch queue of limited size that is located between IFU 120 and DEC 140. As described above, because of the limited space that is available in the fetch queue, the fetch queue may fill up especially in systems that perform out-of-order fetch operations. In systems that perform out-of-order fetch operations, the fetch queue may in particular fill up fast in cases where a cache miss is followed by several cache hits, preventing later cache misses from being prefetched. In various embodiments, as described above with reference to FIG. 2, branch predictor directed prefetch operations do not store prefetched instruction data in the fetch queue and are therefore not limited by the size of the fetch queue. Instead, the prefetch operations store the prefetched data in the iCache 110 or a prefetch buffer, depending on the design of the processor core 100. These memory locations are designed to store instruction data for future fetch operations and do not have the same space limitations compared to the fetch queue. Therefore, these prefetch operations may "run ahead" farther than typical out-of-order fetch operations, and may help to further reduce instruction cache misses. Furthermore, in some embodiments, unlike typical fetch operations, these fetch operations may only check the cache tags to determine whether the cache (e.g., iCache 110) includes certain instruction data.

In various embodiments, besides helping to reduce instruction cache misses, this prefetching mechanism may help eliminate or substantially reduce way mispredictions. In one specific implementation, when a set-associative cache receives a prefetch request, the cache may return a set of four candidate cache lines (or four ways). The prefetch operation may then perform a tag comparison to determine which one of the cache lines to select. The prefetch operation may determine the cache line to select based on information derived from BPU 130, that is PBU 130 may predict the next instruction in the predicted instruction stream. If the incorrect cache line (or way) is selected, which is referred to as a way misprediction, it usually results in a performance hit in the normal fetch mode. However, a way misprediction during the prefetch mode may actually improve performance because the mechanism may remember the correct way prediction in the normal fetch mode. In other words, since the incorrect way was selected in during the prefetch mode, the mechanism may know the correct way to select during the normal fetch mode. At the very least, the mechanism may eliminate one incorrect way selection during the prefetch mode, and therefore have a higher probability of selecting the correct way during the normal fetch mode.

Figure 3:
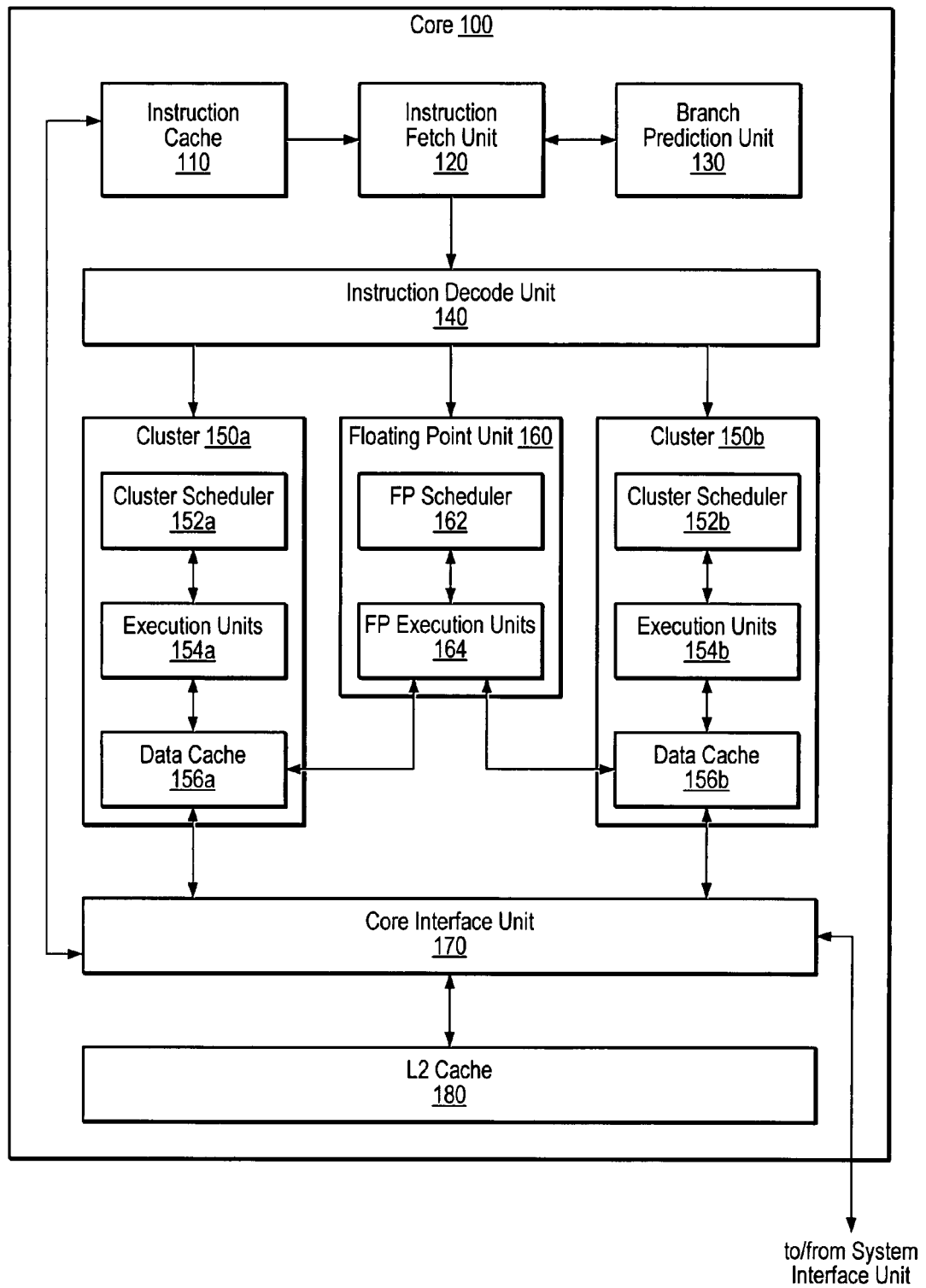
FIG. 3 is a block diagram of one embodiment of the processor core of FIG. 1.

Turning now to FIG. 3, a block diagram of one embodiment of the processor core 100 of FIG. 1 is shown. Generally speaking, core 100 may be configured to execute instructions that may be stored in a system memory that is directly or indirectly coupled to core 100. Such instructions may be defined according to a particular instruction set architecture (ISA). For example, core 100 may be configured to implement a version of the x86 ISA, although in other embodiments core 100 may implement a different ISA or a combination of ISAs.

In the illustrated embodiment, core 100 may include the instruction cache (IC) 110 coupled to provide instructions to the instruction fetch unit (IFU) 120. IFU 120 may be coupled to the branch prediction unit (BPU) 130 and to the instruction decode unit (DEC) 140. DEC 140 may be coupled to provide operations to a plurality of integer execution clusters 150a-b as well as to a floating point unit (FPU) 160. Each of clusters 150a-b may include a respective cluster scheduler 152a-b coupled to a respective plurality of integer execution units 154a-b. Clusters 150a-b may also include respective data caches 156a-b coupled to provide data to execution units 154a-b. In the illustrated embodiment, data caches 156a-b may also provide data to floating point execution units 164 of FPU 160, which may be coupled to receive operations from FP scheduler 162. Data caches 156a-b and instruction cache 110 may additionally be coupled to core interface unit 170, which may in turn be coupled to a unified L2 cache 180 as well as to a system interface unit (SIU) that is external to core 100 (shown in FIG. 4 and described below). It is noted that although FIG. 3 reflects certain instruction and data flow paths among various units, additional paths or directions for data or instruction flow not specifically shown in FIG. 3 may be provided.

As described in greater detail below, core 100 may be configured for multithreaded execution in which instructions from distinct threads of execution may concurrently execute. In one embodiment, each of clusters 150a-b may be dedicated to the execution of instructions corresponding to a respective one of two threads, while FPU 160 and the upstream instruction fetch and decode logic may be shared among threads. In other embodiments, it is contemplated that different numbers of threads may be supported for concurrent execution, and different numbers of clusters 150 and FPUs 160 may be provided.

Instruction cache 110 may be configured to store instructions prior to their being retrieved, decoded and issued for execution. In various embodiments, instruction cache 110 may be configured as a direct-mapped, set-associative or fully-associative cache of a particular size, such as an 8-way, 64 kilobyte (KB) cache, for example. Instruction cache 110 may be physically addressed, virtually addressed or a combination of the two (e.g., virtual index bits and physical tag bits). In some embodiments, instruction cache 110 may also include translation lookaside buffer (TLB) logic configured to cache virtual-to-physical translations for instruction fetch addresses, although TLB and translation logic may be included elsewhere within core 100.

Instruction fetch accesses to instruction cache 110 may be coordinated by IFU 120. For example, WFU 120 may track the current program counter status for various executing threads and may issue fetches to instruction cache 110 in order to retrieve additional instructions for execution. In the case of an instruction cache miss, either instruction cache 110 or IFU 120 may coordinate the retrieval of instruction data from L2 cache 180. In some embodiments, IFU 120 may also coordinate prefetching of instructions from other levels of the memory hierarchy in advance of their expected use in order to mitigate the effects of memory latency. For example, successful instruction prefetching may increase the likelihood of instructions being present in instruction cache 110 when they are needed, thus avoiding the latency effects of cache misses at possibly multiple levels of the memory hierarchy. In various embodiments, IFU 120 may execute branch predictor directed prefetch operations to iCache 110 and/or to other levels of the memory hierarchy in response to detecting a cache miss during the normal fetch mode, as described above with reference to FIG. 2.

Various types of branches (e.g., conditional or unconditional jumps, call/return instructions, etc.) may alter the flow of execution of a particular thread. Branch prediction unit 130 may generally be configured to predict future fetch addresses for use by IFU 120. In some embodiments, BPU 130 may include a branch target buffer (BTB) that may be configured to store a variety of information about possible branches in the instruction stream. For example, the BTB may be configured to store information about the type of a branch (e.g., static, conditional, direct, indirect, etc.), its predicted target address, a predicted way of instruction cache 110 in which the target may reside, or any other suitable branch information. In some embodiments, BPU 130 may include multiple BTBs arranged in a cache-like hierarchical fashion. Additionally, in some embodiments BPU 130 may include one or more different types of predictors (e.g., local, global, or hybrid predictors) configured to predict the outcome of conditional branches. In one embodiment, the execution pipelines of IFU 120 and BPU 130 may be decoupled such that branch prediction may be allowed to "run ahead" of instruction fetch, allowing multiple future fetch addresses to be predicted and queued until IFU 120 is ready to service them. It is contemplated that during multi-threaded operation, the prediction and fetch pipelines may be configured to concurrently operate on different threads.

As a result of fetching, IFU 120 may be configured to produce sequences of instruction bytes, which may also be referred to as fetch packets. For example, a fetch packet may be 32 bytes in length, or another suitable value. In some embodiments, particularly for ISAs that implement variable-length instructions, there may exist variable numbers of valid instructions aligned on arbitrary boundaries within a given fetch packet, and in some instances instructions may span different fetch packets. Generally speaking DEC 140 may be configured to identify instruction boundaries within fetch packets, to decode or otherwise transform instructions into operations suitable for execution by clusters 150 or FPU 160, and to dispatch such operations for execution.

In one embodiment, DEC 140 may be configured to first determine the length of possible instructions within a given window of bytes drawn from one or more fetch packets. For example, for an x86-compatible ISA, DEC 140 may be configured to identify valid sequences of prefix, opcode, "mod/rm" and "SIB" bytes, beginning at each byte position within the given fetch packet. Pick logic within DEC 140 may then be configured to identify, in one embodiment, the boundaries of up to four valid instructions within the window. In one embodiment, multiple fetch packets and multiple groups of instruction pointers identifying instruction boundaries may be queued within DEC 140, allowing the decoding process to be decoupled from fetching such that IFU 120 may on occasion "fetch ahead" of decode.

Instructions may then be steered from fetch packet storage into one of several instruction decoders within DEC 140. In one embodiment, DEC 140 may be configured to dispatch up to four instructions per cycle for execution, and may correspondingly provide four independent instruction decoders, although other configurations are possible and contemplated. In embodiments where core 100 supports microcoded instructions, each instruction decoder may be configured to determine whether a given instruction is microcoded or not, and if so may invoke the operation of a microcode engine to convert the instruction into a sequence of operations. Otherwise, the instruction decoder may convert the instruction into one operation (or possibly several operations, in some embodiments) suitable for execution by clusters 150 or FPU 160. The resulting operations may also be referred to as micro-operations, micro-ops, or uops, and may be stored within one or more queues to await dispatch for execution. In some embodiments, microcode operations and non-microcode (or "fastpath") operations may be stored in separate queues.

Dispatch logic within DEC 140 may be configured to examine the state of queued operations awaiting dispatch in conjunction with the state of execution resources and dispatch rules in order to attempt to assemble dispatch parcels. For example, DEC 140 may take into account the availability of operations queued for dispatch, the number of operations queued and awaiting execution within clusters 150 and/or FPU 160, and any resource constraints that may apply to the operations to be dispatched. In one embodiment, DEC 140 may be configured to dispatch a parcel of up to four operations to one of clusters 150 or FPU 160 during a given execution cycle.

In one embodiment, DEC 140 may be configured to decode and dispatch operations for only one thread during a given execution cycle. However, it is noted that IFU 120 and DEC 140 need not operate on the same thread concurrently. Various types of thread-switching policies are contemplated for use during instruction fetch and decode. For example, IFU 120 and DEC 140 may be configured to select a different thread for processing every N cycles (where N may be as few as 1) in a round-robin fashion. Alternatively, thread switching may be influenced by dynamic conditions such as queue occupancy. For example, if the depth of queued decoded operations for a particular thread within DEC 140 or queued dispatched operations for a particular cluster 150 falls below a threshold value, decode processing may switch to that thread until queued operations for a different thread run short. In some embodiments, core 100 may support multiple different thread-switching policies, any one of which may be selected via software or during manufacturing (e.g., as a fabrication mask option).

Generally speaking, clusters 150 may be configured to implement integer arithmetic and logic operations as well as to perform load/store operations. In one embodiment, each of clusters 150a-b may be dedicated to the execution of operations for a respective thread, such that when core 100 is configured to operate in a single-threaded mode, operations may be dispatched to only one of clusters 150. Each cluster 150 may include its own scheduler 152, which may be configured to manage the issuance for execution of operations previously dispatched to the cluster. Each cluster 150 may further include its own copy of the integer physical register file as well as its own completion logic (e.g., a reorder buffer or other structure for managing operation completion and retirement).

Within each cluster 150, execution units 154 may support the concurrent execution of various different types of operations. For example, in one embodiment execution units 154 may support two concurrent load/store address generation (AGU) operations and two concurrent arithmetic/logic (ALU) operations, for a total of four concurrent integer operations per cluster. Execution units 154 may support additional operations such as integer multiply and divide, although in various embodiments, clusters 150 may implement scheduling restrictions on the throughput and concurrency of such additional operations with other ALU/AGU operations. Additionally, each cluster 150 may have its own data cache 156 that, like instruction cache 110, may be implemented using any of a variety of cache organizations. It is noted that data caches 156 may be organized differently from instruction cache 110.

In the illustrated embodiment, unlike clusters 150, FPU 160 may be configured to execute floating-point operations from different threads, and in some instances may do so concurrently. FPU 160 may include FP scheduler 162 that, like cluster schedulers 152, may be configured to receive, queue and issue operations for execution within FP execution units 164. FPU 160 may also include a floating-point physical register file configured to manage floating-point operands. FP execution units 164 may be configured to implement various types of floating point operations, such as add, multiply, divide, and multiply-accumulate, as well as other floating-point, multimedia or other operations that may be defined by the ISA. In various embodiments, FPU 160 may support the concurrent execution of certain different types of floating-point operations, and may also support different degrees of precision (e.g., 64-bit operands, 128-bit operands, etc.). As shown, FPU 160 may not include a data cache but may instead be configured to access the data caches 156 included within clusters 150. In some embodiments, FPU 160 may be configured to execute floating-point load and store instructions, while in other embodiments, clusters 150 may execute these instructions on behalf of FPU 160.

Instruction cache 110 and data caches 156 may be configured to access L2 cache 180 via core interface unit 170. In one embodiment, CIU 170 may provide a general interface between core 100 and other cores 100 within a system, as well as to external system memory, peripherals, etc. L2 cache 180, in one embodiment, may be configured as a unified cache using any suitable cache organization. Typically, L2 cache 180 will be substantially larger in capacity than the first-level instruction and data caches.

In some embodiments, core 100 may support out of order execution of operations, including load and store operations. That is, the order of execution of operations within clusters 150 and FPU 160 may differ from the original program order of the instructions to which the operations correspond. Such relaxed execution ordering may facilitate more efficient scheduling of execution resources, which may improve overall execution performance.

Additionally, core 100 may implement a variety of control and data speculation techniques. As described above, core 100 may implement various branch prediction and speculative prefetch techniques in order to attempt to predict the direction in which the flow of execution control of a thread will proceed. Such control speculation techniques may generally attempt to provide a consistent flow of instructions before it is known with certainty whether the instructions will be usable, or whether a misspeculation has occurred (e.g., due to a branch misprediction). If control misspeculation occurs, core 100 may be configured to discard operations and data along the misspeculated path and to redirect execution control to the correct path. For example, in one embodiment clusters 150 may be configured to execute conditional branch instructions and determine whether the branch outcome agrees with the predicted outcome. If not, clusters 150 may be configured to redirect IFU 120 to begin fetching along the correct path.

Separately, core 100 may implement various data speculation techniques that attempt to provide a data value for use in further execution before it is known whether the value is correct. For example, in a set-associative cache, data may be available from multiple ways of the cache before it is known which of the ways, if any, actually hit in the cache. In one embodiment, core 100 may be configured to perform way prediction as a form of data speculation in instruction cache 110, data caches 156 and/or L2 cache 180, in order to attempt to provide cache results before way hit/miss status is known. If incorrect data speculation occurs, operations that depend on misspeculated data may be "replayed" or reissued to execute again. For example, a load operation for which an incorrect way was predicted may be replayed. When executed again, the load operation may either be speculated again based on the results of the earlier misspeculation (e.g., speculated using the correct way, as determined previously) or may be executed without data speculation (e.g., allowed to proceed until way hit/miss checking is complete before producing a result), depending on the embodiment. In various embodiments, core 100 may implement numerous other types of data speculation, such as address prediction, load/store dependency detection based on addresses or address operand patterns, speculative store-to-load result forwarding, data coherence speculation, or other suitable techniques or combinations thereof.

Figure 4:
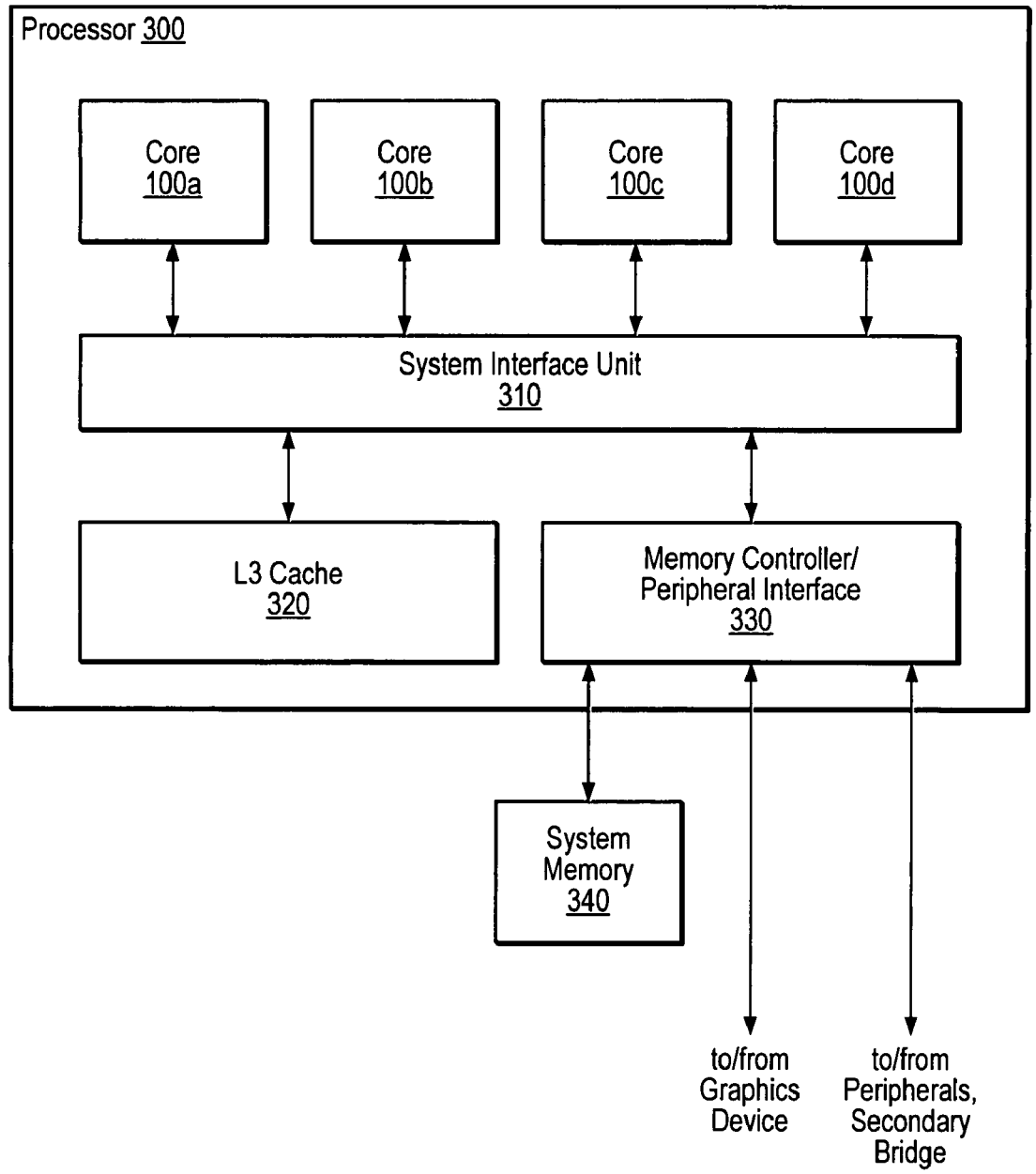
FIG. 4 is a block diagram of one embodiment of a processing unit including multiple processing cores.

In various embodiments, a processor implementation may include multiple instances of core 100 fabricated as part of a single integrated circuit along with other structures. One such embodiment of a processor is illustrated in FIG. 4. As shown, processor 300 includes four instances of core 100a-d, each of which may be configured as described above. In the illustrated embodiment, each of cores 100 may couple to an L3 cache 320 and a memory controller/peripheral interface unit (MCU) 330 via a system interface unit (SfU) 310. In one embodiment, L3 cache 320 may be configured as a unified cache, implemented using any suitable organization, that operates as an intermediate cache between L2 caches 180 of cores 100 and relatively slow system memory 340.

MCU 330 may be configured to interface processor 300 directly with system memory 340. For example, MCU 330 may be configured to generate the signals necessary to support one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory that may be used to implement system memory 340. System memory 340 may be configured to store instructions and data that may be operated on by the various cores 100 of processor 300, and the contents of system memory 340 may be cached by various ones of the caches described above.

Additionally, MCU 330 may support other types of interfaces to processor 300. For example, MCU 330 may implement a dedicated graphics processor interface such as a version of the Accelerated/Advanced Graphics Port (AGP) interface, which may be used to interface processor 300 to a graphics-processing subsystem, which may include a separate graphics processor, graphics memory and/or other components. MCU 330 may also be configured to implement one or more types of peripheral interfaces, e.g., a version of the PCI-Express bus standard, through which processor 300 may interface with peripherals such as storage devices, graphics devices, networking devices, etc. In some embodiments, a secondary bus bridge (e.g., a "south bridge") external to processor 300 may be used to couple processor 300 to other peripheral devices via other types of buses or interconnects. It is noted that while memory controller and peripheral interface functions are shown integrated within processor 300 via MCU 330, in other embodiments these functions may be implemented externally to processor 300 via a conventional "north bridge" arrangement. For example, various functions of MCU 330 may be implemented via a separate chipset rather than being integrated within processor 300.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   an instruction cache;
   a fetch unit coupled to the instruction cache and configured to perform fetch operations;
   a branch prediction unit coupled to the fetch unit and configured to provide, to the fetch unit, an address of a predicted first instruction, an address of a predicted next instruction, and way prediction information for the predicted next instruction, wherein the way prediction information includes a prediction of a particular way within the instruction cache that stores the predicted next instruction;
   wherein the fetch unit is configured to send a fetch request for the predicted first instruction to the instruction cache to perform a fetch operation;
   wherein, in response to detecting a cache miss corresponding to the predicted first instruction, the fetch unit is configured to perform one or more prefetch operations while the cache miss corresponding to the predicted first instruction is being serviced;
   wherein to perform the one or more prefetch operations, the fetch unit is configured to send a prefetch request for the predicted next instruction to the instruction cache, wherein the prefetch request includes the way prediction information; and
   wherein, during subsequent fetch operations, the fetch unit is configured to use way misprediction information resulting from a miss in the instruction cache corresponding to the prefetch request.

2. The apparatus of claim 1, wherein, in response to detecting a cache miss corresponding to the predicted first instruction, the fetch unit is configured to send a fetch request for the predicted first instruction to a next level of memory to service the cache miss.

3. The apparatus of claim 1, wherein the branch prediction unit is configured to predict the address of the next instruction in an instruction stream, and provide the address of the predicted next instruction to the fetch unit.

4. The apparatus of claim 1, wherein in response to detecting a cache miss corresponding to the predicted next instruction, the fetch unit is configured to send a prefetch request for the predicted next instruction to a next level of memory.

5. The apparatus of claim 4, wherein in response to detecting a cache miss corresponding to the predicted next instruction, the fetch unit is configured to send a prefetch request for the predicted next instruction to an L2 cache.

6. The apparatus of claim 4, wherein, in response to detecting a cache hit in the next level of memory, the fetch unit is configured to store prefetched instruction data corresponding to the predicted next instruction in the instruction cache.

7. The apparatus of claim 4, wherein, in response to detecting a cache hit in the next level of memory, the fetch unit is configured to store prefetched instruction data corresponding to the predicted next instruction in a prefetch buffer.

8. The apparatus of claim 1, wherein in response to detecting a cache hit corresponding to the predicted next instruction, the fetch unit is configured to send a next prefetch request for a subsequent predicted instruction to the instruction cache to perform a next prefetch operation, wherein the fetch unit is configured to obtain an address of the subsequent predicted instruction from the branch prediction unit.

9. The apparatus of claim 1, wherein, after servicing the cache miss corresponding to the predicted first instruction, the fetch unit is configured to stop performing prefetch operations and resume performing fetch operations.

10. The apparatus of claim 1, wherein the fetch unit is configured to perform a plurality of prefetch operations while the cache miss corresponding to the predicted first instruction is being serviced, wherein performing the plurality of prefetch operations reduces cache misses and way mispredictions during the subsequent fetch operations.

11. The apparatus of claim 1, wherein the branch prediction unit is configured to predict the address of a next instruction based on a predicted outcome of one or more branches in an instruction stream, wherein the address of the predicted next instruction is a non-sequential address.

12. The apparatus of claim 1, wherein the apparatus is a processing unit including one or more processing cores.

13. A method comprising:
    performing by a computer:
       providing, to a fetch unit, an address of a predicted first instruction, an address of a predicted next instruction, and way prediction information for the predicted next instruction, wherein the way prediction information includes a prediction of a particular way within an instruction cache that stores the predicted next instruction;
       sending a fetch request for the predicted first instruction to the instruction cache to perform a fetch operation;
       in response to detecting a cache miss corresponding to the predicted first instruction, performing one or more prefetch operations while the cache miss corresponding to the predicted first instruction is being serviced;
       wherein said performing one or more prefetch operations includes sending a prefetch request for the predicted next instruction to the instruction cache, where in the prefetch request includes the way prediction information; and
       during subsequent fetch operations, using way misprediction information resulting from a miss in the instruction cache corresponding to the prefetch request.

14. The method of claim 13, further comprising, in response to detecting a cache miss corresponding to the predicted next instruction, sending a prefetch request for the predicted next instruction to a next level of memory.

15. The method of claim 14, further comprising, in response to detecting a cache hit in the next level of memory, storing prefetched instruction data corresponding to the predicted next instruction in one of the instruction cache or a prefetch buffer.

16. The method of claim 13, further comprising, after servicing the cache miss corresponding to the predicted first instruction, stopping performance of prefetch operations and resuming performance of fetch operations.

17. A system comprising:
- a memory unit; and
- a processing unit coupled to the memory unit, wherein the processing unit includes:
  - an instruction cache;
  - a fetch unit coupled to the instruction cache and configured to perform fetch operations;
  - a branch prediction unit coupled to the fetch unit and configured to provide, to the fetch unit, an address of a predicted first instruction, an address of a predicted next instruction and way prediction information for the predicted next instruction, wherein the way prediction information includes a prediction of a particular way within the instruction cache that stores the predicted next instruction;
  - wherein the fetch unit is configured to send a fetch request for the predicted first instruction to the instruction cache to perform a fetch operation;
  - wherein, in response to detecting a cache miss corresponding to the predicted first instruction, the fetch unit is configured to perform one or more prefetch operations while the cache miss corresponding to the predicted first instruction is being serviced;
  - wherein to perform the one or more prefetch operations, the fetch unit is configured to send a prefetch request for the predicted next instruction to the instruction cache, wherein the prefetch request includes the way prediction information; and
  - wherein, during subsequent fetch operations, the fetch unit is configured to use way misprediction information resulting from a miss in the instruction cache corresponding to the prefetch request.

18. The system of claim 17, wherein in response to detecting a cache miss corresponding to the predicted next instruction, the fetch unit is configured to send a prefetch request for the predicted next instruction to a next level of memory, wherein the next level of memory is the memory unit.

19. The system of claim 18, wherein, in response to detecting a cache hit in the next level of memory, the fetch unit is configured to store prefetched instruction data corresponding to the predicted next instruction in one of the instruction cache or a prefetch buffer.

20. The system of claim 17, wherein, after servicing the cache miss corresponding to the predicted first instruction, the fetch unit is configured to stop performing prefetch operations and resume performing fetch operations.

\* \* \* \* \*